July 21, 1953 A. W. WEEMS 2,645,892
COTTON-PICKING SPINDLE AND STRIPPER THEREFOR
Filed Sept. 12, 1950 2 Sheets-Sheet 1
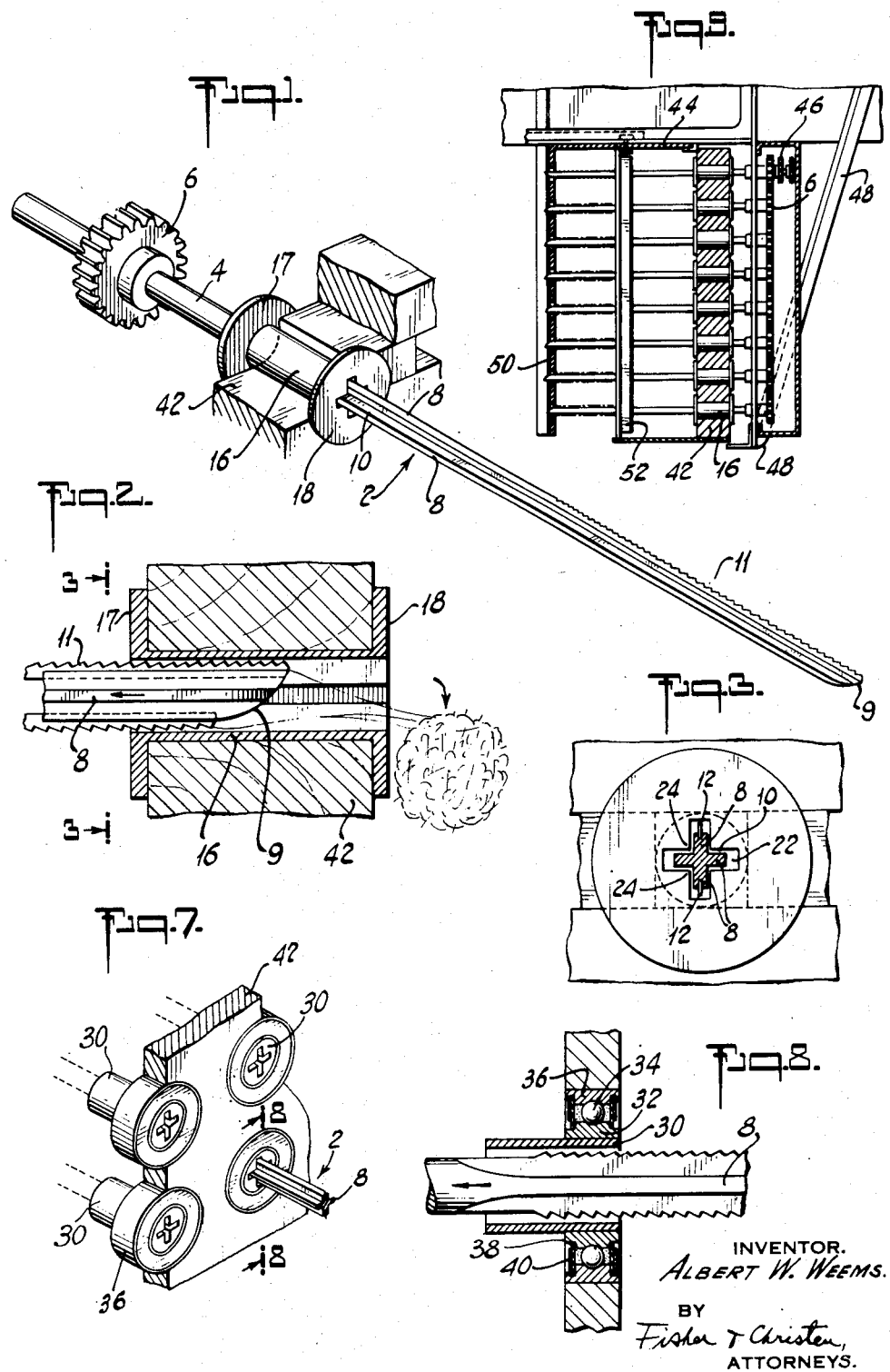
INVENTOR.
ALBERT W. WEEMS.
BY
Fisher & Christen,
ATTORNEYS.

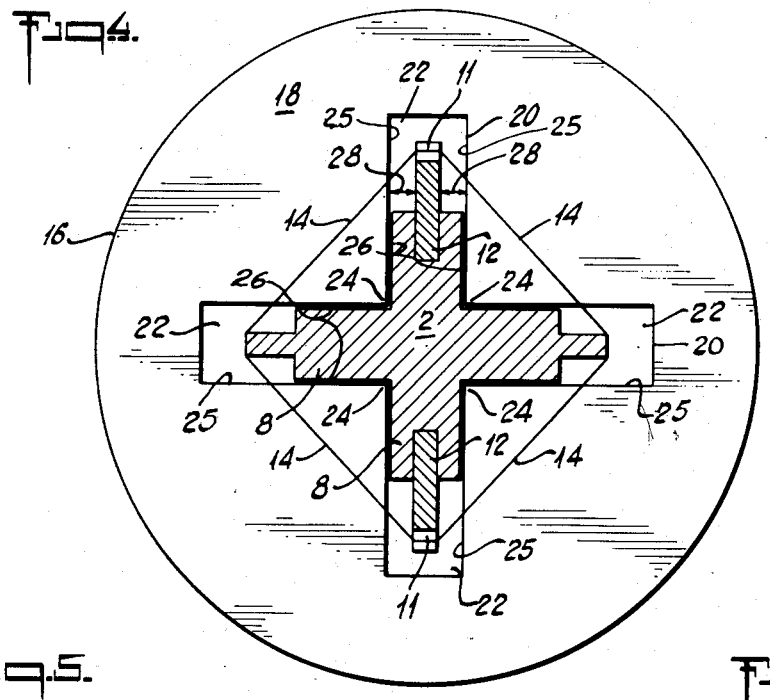
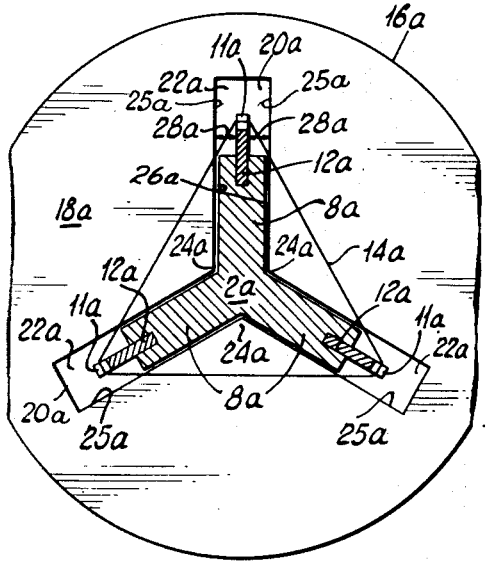
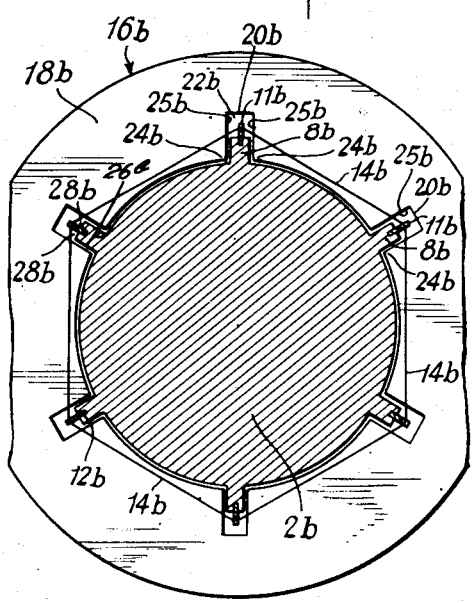

Patented July 21, 1953

2,645,892

UNITED STATES PATENT OFFICE 2,645,892

COTTON-PICKING SPINDLE AND STRIPPER THEREFOR

Albert W. Weems, Meridian, Miss.

Application September 12, 1950, Serial No. 184,356

3 Claims. (Cl. 56—50)

This invention is a combined spindle and stripper, for use in a machine for picking cotton. This application is a continuation in part of application Serial No. 734,895, filed March 15, 1947, now Patent 2,585,062, dated February 12, 1952, and a continuation in part of application Serial No. 104,338, filed July 12, 1949.

The principal object of the present invention is to provide a picking spindle which rotates continuously in one direction, which will pick cotton rapidly and efficiently from the bolls, will pick a minimum of trash, and from which the cotton can be stripped by a stripper which cooperates with the picking spindle.

The spindle of this invention is provided with a plurality of longitudinally extending ribs, which define longitudinally extending grooves between them. Preferably four such ribs are used, placed 90° apart, so that the spindle is of cruciform shape. However, a greater or lesser number of ribs may be used if desired.

One or more of the ribs, preferably a pair of opposite ribs, are provided with teeth; a convenient way of providing teeth is to set the back of a hack saw blade edgewise and longitudinally into a groove in the ribs.

The teeth on a rib are thinner than the rib itself, so that a clearance space is provided on each side of the teeth.

The spindle is positively driven by a gear secured thereto.

The tip of the spindle is beveled or contoured asymmetrically, in order to fend or push aside the stalks of the cotton plant.

The stripper with which each spindle is provided and through which the spindle passes, is approximately spool shaped, is shaped to slidably engage the spindle and rotates with it. The several strippers are journaled in a suitable support.

Each stripper is provided with a flat outer face, toward the end of the spindle and this flat outer face is provided with radial slots, which define inwardly and radically extending "corners," which corners fit fairly snugly into the grooves between the ribs on the spindle, with just enough clearance to allow the stripper to slide freely with respect to the spindle. The radial slots are extended a short distance beyond the outer edges of the ribs; since the toothed saw blade is thinner than the rib which carries it, a clearance space is provided on each side of each blade. This construction is important, because it avoids jamming of the cotton fibers between the stripper and spindle, the action being substantially as follows: As the spindle rotates, the fibers wrap around the spindle and bridge over from one rib to the next, the inwardly extending corners of the stripper extending substantially all the way into the grooves between the ribs, within and below the fibers bridged over from one rib to the next. This enables such corners readily to push the fibers off the spindle, without any jamming of the fibers between the stripper and the ribs, because the fibers are held away from the contacting surfaces of the stripper and the ribs and so cannot jam into the space between them. This stripping is greatly aided by the described clearance space between the sides of the saw blade and the edge of the adjacent slot, preventing the shearing and breaking of the fibers as they are disengaged from the teeth.

Further features of structure and operation will be described in connection with the accompanying drawings wherein:

Fig. 1 is a perspective view of the spindle and stripper of the present invention.

Fig. 2 is an enlarged central and vertical longitudinal sectional view through the stripper with a portion of the spindle shown therein.

Fig. 3 is an end view taken on the line 3—3 of Fig. 2.

Fig. 4 is an enlarged end elevational view of the spindle and stripper with the spindle being broken away and shown in section.

Figs. 5 and 6 are views similar to Fig. 4 showing two modifications.

Fig. 7 is a perspective view of another modification.

Fig. 8 is an enlarged sectional view on the line 8—8 of Fig. 7.

Fig. 9 is a fragmentary elevational view of a cotton picking unit with parts broken away and shown in section showing a column of spindles and strippers, each spindle and stripper being of the type shown in Figure 1.

The spindle indicated generally at 2, comprises a portion 4 to which is fixed a gear 6 for rotating it. The main portion of the spindle is provided with a plurality of longitudinally extending ribs 8, preferably four. These ribs define longitudinally extending grooves 10. The outer end of each spindle is provided with a non-symmetrical beveled end 9, which pushes aside a cotton stalk rather than tends to bore into it.

One or more of the ribs 8 is serrated, being provided with teeth 11 angled toward the tip of the spindle. A convenient way of providing teeth is by setting the back of hack saw blade 12 edgewise into the rib. Preferably, two opposite ribs are provided with teeth. Blade 12 is thinner than the rib on which it is mounted, thereby leaving a clearance space on either side of the teeth.

When the spindle rotates and picks up a load of cotton fibers, such fibers 14 extend circumferentially around the spindle, passing from the roots of the teeth on 12, around the outer edge of the next rib, through the teeth on the next rib, around the outer edge of the next rib, and so on, to form an approximately square pattern.

Cooperating with each spindle is a stripper 16, slidable with respect to the spindle. The stripper is approximately spool shaped, having inner and outer flanged faces 17 and 18. An important feature of the stripper is the flat stripping face 18, having slots 20, here four in number, to engage over the ribs 8, with clearance 22 beyond the edges of the ribs. The flat stripping face 18, as shown in Fig. 2, is substantially perpendicular to the axis of the spindle. These flat faces facilitate the removal of the cotton from the strippers themselves, since they have no obstructions with which to catch the cotton fibers after these strippers have pushed the cotton off from the end of the spindle.

The slots define between them radially and inwardly extending corners 24, the edges 25 of the slots being very close to or in actual sliding contact with the sides 26 of the ribs 8. The corners 24 extend within and below the pattern 14 of fibers wrapped around the spindle. Also, there is a clearance space 28 between the sides of the teeth and the adjacent edge 25 of corner 24.

In use, the spindle rotates continuously and picks up a load of fibers. At short intervals, the stripper 16 moves outwardly on the spindle, corners 24 engaging within and under pattern of fibers 14 and pushing them off the spindle. The sliding or working surfaces between the side edges of member 24 and the side walls of the ribs are thus out of range of the fibers 14, thus preventing the jamming of cotton fibers 14 between these working surfaces. This stripping is facilitated by the clearance spaces 22 beyond the end of the ribs, and particularly by the clearance spaces 28 on either side of the teeth, enabling the corners to disengage the fibers from the teeth without shearing them.

In the modification shown in Fig. 5, the spindle is shown as provided with three ribs instead of four. Otherwise, the operation is similar to the parts shown in Fig. 5, and corresponding parts are indicated by corresponding numerals, plus the letter "a." Thus, spindle 2a is provided with three ribs 8a, about 120° apart. These ribs are provided with teeth 11a, carried by a saw blade set edgewise into the rib. The fibers wrap around the spindle, forming a pattern 14a. Stripper 16a has a flat stripping face 18a. The stripper is provided with slots 20a, the edges 25a of the slots being close to the side walls 26a of the ribs. The corners 24a extend inwardly within and below the pattern of fibers 14a; clearance spaces 28a are provided between blades 12 and the edges of the slots 20a.

In use, the corner members strip the fibers 14 from the spindle, clearance spaces 28a preventing shearing of the fibers.

In the modification shown in Fig. 6, corresponding parts are similarly numbered, plus the letter "b." Thus, spindle 2b is provided with ribs 8b, having teeth 11b extending lengthwise thereof. The fibers wrap around the spindle in a pattern 14b. A stripper 16b having a flat stripping face 18b is provided with slots 20b engaging over the teeth with clearance 22b. The edges 25b of the slots fit closely against the sides 26b of the teeth. The stripper is provided with inwardly extending corner members 24b, which extend inwardly and below the fibers 14b. Clearance spaces 28a prevent shearing of the fibers.

In the modification shown in Figs. 7 and 8, double shielded roller bearings are used for the strippers. A cruciform core 30 is slotted to fit over the ribs 8 as does 18 in Fig. 4. This core is secured to inner raceway 32 for ball bearings 34, the outer raceway of which is shown at 36. Annular gaskets or seals 38 and retaining rings 40 are provided, to retain lubricant in the raceway and to exclude fibers.

The strippers 16 or 30 are journaled in a column 42, Fig. 9, fixed to the frame 44 of the machine. The spindles are rotated at a speed preferably around 1200–2500 R. P. M., their gears 6 intermeshing and being driven by a sprocket 46. The bank of spindles and their operating gears are carried by a reciprocating frame 48, as more fully described in copending application Ser. No. 734,895, filed March 15, 1947, now Patent 2,585,062, dated February 12, 1952. Where the spindles are in a rotating bank, they are reciprocated through the strippers as described in copending application Ser. No. 104,338, filed July 12, 1949.

Referring to Fig. 9, an abutment plate 50 may be provided at the far side of the picking chamber, as shown in the above mentioned pending applications. Also, a shutter plate 52 may be provided, between the stripper column 42 and abutment plate 50, as described in my Patent 2,585,062 aforesaid.

There has thus been provided a spindle and stripper which will pick a maximum amount of cotton and a minimum amount of trash, and what is very important, a stripper which will strip the spindle clean at each stroke and which will not pick up and be clogged by cotton fibers and by the gummy substance known as "cotton honey."

While the invention has been described in some detail, it should be understood that the invention is not to be limited to the precise details shown but may be carried out in other ways.

I claim as my invention:

1. In a cotton picking machine, in combination, a substantially cylindrical spindle provided with longitudinally and radially extending ribs having substantially parallel sides and defining longitudinally extending, substantially V-shaped grooves between them, the outer edges of at least two of said ribs being provided with serrations; an annular stripper slidable on said spindle, said stripper being provided with a substantially flat stripper face and having an axial opening therethrough conforming in cross-section to that of said spindle, but slightly larger than the spindle, said stripper providing inwardly extending corners which project radially inwardly into said grooves and between said ribs, said corners being adapted to engage under the pattern of fibers wrapped around the spindle and cooperating with the flat face of the stripper, to push a load of cotton off the spindle.

2. The combination as set forth in claim 1, wherein said axial opening in the flat stripper face extends outwardly beyond said serrations and is wider than said serrations, for providing a clearance space around the serrations.

3. The combination as set forth in claim 1, wherein the outer end of said spindle is asymmetric.

ALBERT W. WEEMS.

References Cited in the file of this patent

UNITED STATES PATENTS

| Number | Name | Date |
|---|---|---|
| 806,941 | Todd | Dec. 12, 1905 |
| 1,543,089 | Bardwell et al. | June 23, 1925 |
| 1,646,594 | Phelps et al. | Oct. 25, 1927 |
| 1,818,537 | Cullander | Aug. 11, 1931 |
| 2,333,965 | Weems | Nov. 9, 1943 |